United States Patent [19]
Alexeff

[11] 3,796,360
[45] Mar. 12, 1974

[54] COMBINATION STORAGE FESTOON AND COMPENSATOR

[75] Inventor: Alexander V. Alexeff, Cleveland, Ohio

[73] Assignee: Alexeff-Snyder Enterprises, Inc., Cleveland, Ohio

[22] Filed: Sept. 27, 1972

[21] Appl. No.: 292,740

[52] U.S. Cl. ............................... 226/119, 226/189
[51] Int. Cl. ............................................ B65h 17/42
[58] Field of Search ..................... 226/118, 119, 189

[56] References Cited
UNITED STATES PATENTS

| | | | |
|---|---|---|---|
| 2,771,984 | 11/1956 | Ranney | 226/119 X |
| 3,109,572 | 11/1963 | Herr | 226/119 X |
| 2,797,089 | 6/1957 | Lorig | 226/119 |
| 3,414,208 | 12/1968 | Butler, Jr. et al. | 226/119 X |
| 2,007,614 | 7/1935 | Prentice | 226/119 X |

Primary Examiner—Allen N. Knowles
Attorney, Agent, or Firm—Donnelly, Maky, Renner & Otto

[57] ABSTRACT

Combination storage festoon and compensator includes a first set of stationary guide rolls and a second set of movable guide rolls carried by a floating frame or carriage for movement toward and away from the stationary rolls. The movable carriage desirably consists of a pair of generally T-shape side members each including a cross member to which the ends of the movable guide rolls are mounted and a vertical center support received between vertical guides to lend greater rigidity and stability to the apparatus. The vertical guides for the carriage may be precisely adjusted to eliminate any tilting or cocking of the carriage, and eccentric cam rollers may also be provided on the carriage to eliminate any undesired clearance between the guide rollers and vertical guides. Hydraulic cylinders control the vertical movements of the carriage, and suitable mechanism may also be provided responsive to the vertical position of the carriage for varying the speed of certain processing operations.

7 Claims, 3 Drawing Figures

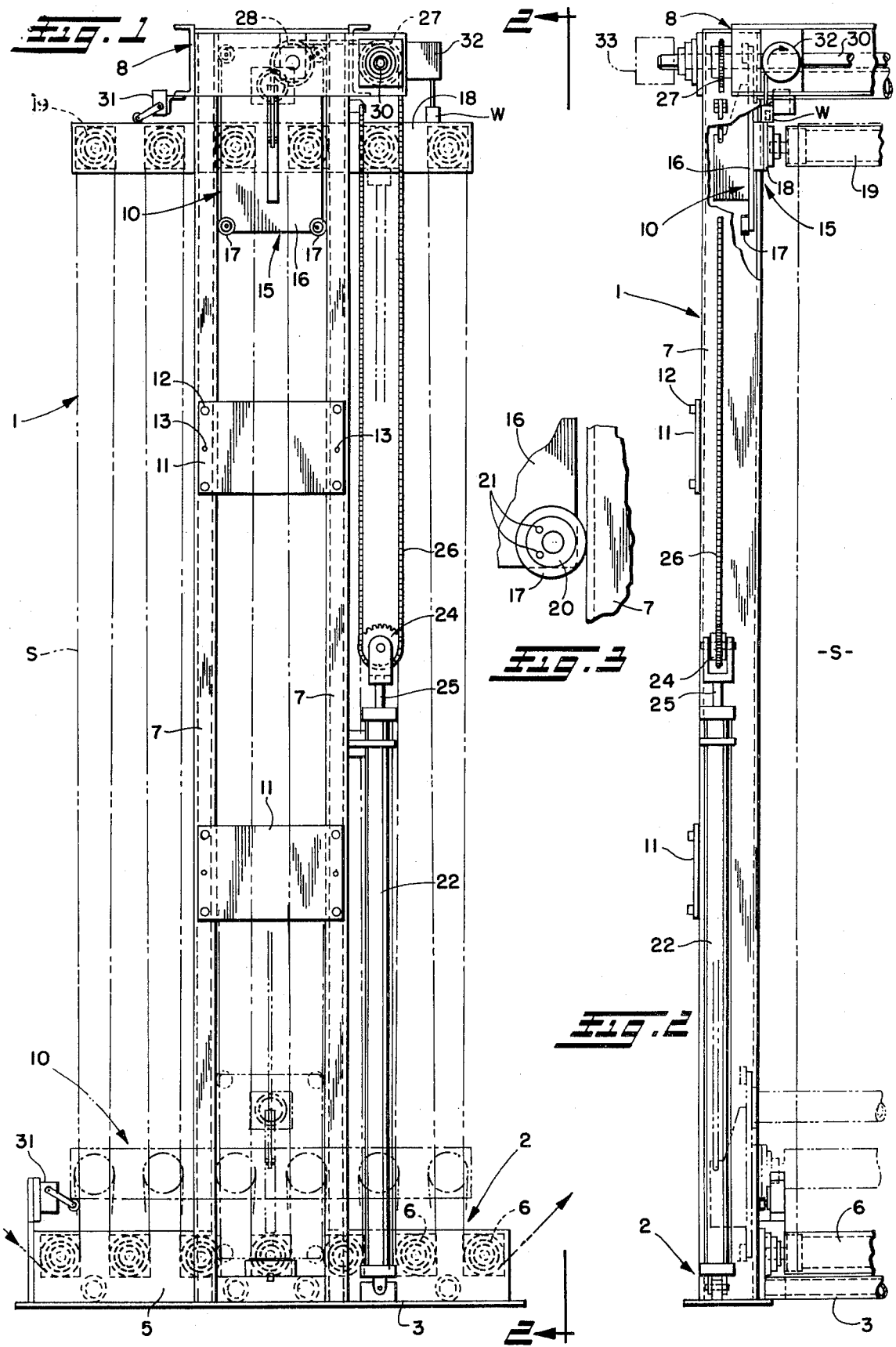

3,796,360

COMBINATION STORAGE FESTOON AND COMPENSATOR

BACKGROUND OF THE INVENTION

This invention relates generally as indicated to a combination storage festoon and compensator especially for use in a fabric strip processing line to maintain continuity of operation and provide for synchronization between two or more processing operations.

In the continuous processing of various types of strip material there are occasions when it is necessary to use a storage festoon to accumulate material and subsequently feed it back into the processing line to maintain continuity in the processing system, for example, when splicing the ends of two strips together or when removing a completed roll and commencing a new one. The time needed to perform such operations may vary anywhere from 30 seconds to 2 minutes, and the storage capacity of the festoon is sufficient to accumulate the material during that period of time.

There are also times when a compensator is needed to synchronize two different operations, for example, two sets of mill rolls used to move fabric from a dipping process to a drying system. The fabric must be synchronized to properly maintain the speed of the corresponding processing operations.

The compensator also normally provides sufficient storage to compensate for variations in speeds between two drive systems, a typical system being two calenders which have to be synchronized to apply rubber material to opposite sides of a wire.

Heretofore, it was the usual practice to provide a separate festoon for accumulating material as required and a separate compensator for maintaining the proper speed of a corresponding processing operation, which not only added to the expense of the system, but also required more floor space in the processing line to accommodate the equipment. Such prior festoons and compensators also did not always maintain proper control of the strip material, and they were usually difficult to assemble and take apart for shipment.

SUMMARY OF THE INVENTION

With the foregoing in mind, it is a principal object of this invention to provide a combination storage festoon and compensator apparatus which may be made very rigid and stable for obtaining positive, accurate control in the processing of the strip material.

Another object is to provide such an apparatus which is relatively simple and inexpensive to manufacture.

Still another object is to provide such an apparatus which is of a relatively compact design and may be easily assembled and taken apart.

These and other objects of the present invention may be achieved using a combination storage festoon and compensator apparatus including a first set of stationary guide rolls mounted on a support base of the main frame and a second set of movable guide rolls carried by a floating frame or carriage for movement toward and away from the stationary rolls. The floating frame or carriage is desirably of generally T-shape including a pair of laterally spaced cross members to which the ends of the movable guide rolls are connected and a pair of vertically extending center supports received between vertical guides to provide greater rigidity and stability to the carriage during vertical movement thereof.

The vertical guides for the carriage may be precisely adjusted to eliminate any tilting or cocking of the carriage which would have an adverse effect on control. Eccentric cam rollers may also be provided on the carriage for engagement with the vertical guides, such cam rollers being adjustable to eliminate any clearance between the cam rollers and vertical guides.

Vertical movement of the carriage is controlled by hydraulic and/or pneumatic cylinders connected to the center of the carriage utilizing chains and sprockets, and suitable means may also be provided responsive to the vertical position of the carriage for varying the speed of the associated strip processing equipment.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a side elevation view of a preferred form of combination storage festoon and compensator apparatus constructed in accordance with this invention;

FIG. 2 is a partial end elevation view of the left-hand side of the apparatus of FIG. 1 as seen from the plane of the line 2—2, the other side being a mirror image of the side shown; and FIG. 3 is a fragmentary enlarged side elevation view of a portion of the movable carriage and vertical guides for the apparatus of FIG. 1.

DESCRIPTION OF THE PREFERRED EMBODIMENT

In the drawings a preferred form of combination storage festoon and compensator apparatus in accordance with this invention is generally indicated by the reference numeral 1 and includes a main support frame 2 having a support base 3 on which is mounted a pair of laterally spaced mounting plates 5 for journaling of the respective ends of a plurality of stationary guide rolls 6. Also mounted on the support base 3 adjacent each of the mounting plates 5 are a pair of vertically extending guides 7 which are rigidly joined together at their upper ends as by a plurality of rigid structural members 8 to provide a rigid, self-supporting structure for a vertically movable floating frame or carriage 10 to be described in greater detail hereafter.

Proper spacing between the vertical guides 7 is maintained by spreader plates 11 which may be bolted at 12 or otherwise secured to the vertical guides 7 along the length thereof and accurately located on the vertical guides by dowel pins 13 or the like.

The carriage 10 desirably consists of a pair of laterally spaced side frames 15 of generally T-shape each including a vertically extending center plate 16 having cam rollers 17 at opposite ends thereof engageable with the vertical guides 7 for guiding the movements thereof and a generally horizontal cross member 18 attached to the center plate 16 substantially centrally thereof for supporting the respective ends of a plurality of movable guide rolls 19 extending between the cross members. Preferably, there is one less movable guide roll 19 than stationary guide roll 6 and the movable guide rolls are staggered with respect to the stationary guide rolls to permit plural passes of the strip material S alternately around the stationary guide rolls and movable guide rolls as shown. The number of guide rolls may of course be varied depending upon the maximum desired storage capacity of the apparatus, but there are preferably at least three guide rolls mounted on the movable carriage, and the guide rolls are uniformly distributed on both sides of the vertical center line of the carriage to prevent undesirable canting or tilting of the carriage during vertical movement thereof. The cam rollers 17 also desirably include eccentric hubs 20 releasably secured in position by suitable fasteners 21 (see FIG. 3) which upon loosening permit rotation of the hubs to eliminate any undesirable clearance space between the cam rollers and vertical guides.

Vertical movement of the carriage 10 toward and away from the stationary guide rolls 6 may be obtained by actuation of a pair of hydraulic cylinders 22 adjacent each side of the apparatus 1, only one of which is shown in FIGS. 1 and 2 because of the symmetrical design of the apparatus. The blind end of each hydraulic cylinder 22 is shown pivotally connected to the support base 3 of the main frame 2, and a sprocket 24 is mounted on the upper free end of the piston rod 25. A pair of chains 26 having one end tied off at the upper end of the vertical guides 7 on each side of the apparatus and the other end suitably connected to the vertical centers of the respective side frames 15 extend around the sprockets on each rod and over a pair of additional sprockets 27 and 28 on each side of the upper frame structure 8 for transmitting the force of the hydraulic cylinders 22 to the vertical centers of the respective side frames 15 of the carriage 10 to prevent application of a tilting force to the carriage during raising and lowering thereof. One or both of the additional sprockets 27, 28 adjacent each side of the apparatus 1 are also desirably mounted on common shafts 30 to assure raising and lowering of both sides of the carriage at the same rate.

During normal operation of a strip processing line, the strip material moving through the line is under sufficient tension to cause the movable carriage 10 to move downwardly against the force of the hydraulic cylinders 22 to the lowermost position shown in phantom lines in FIGS. 1 and 2 thus reducing to a minimum the amount of material accumulated by the apparatus.

However, should a drop in the tension in the strip material occur, as when the line is stopped to splice two strips together or remove a completed roll of material and start a new one, the force of the hydraulic cylinders 22 acting on the carriage will cause the carriage to move upwardly along the vertical guides 7 for accumulating the material until the line is in operation once again and the accumulated material is fed back into the processing line thus to maintain continuity of the processing operation.

Rotary switches 31 may be positioned adjacent opposite ends of the vertical guides 7 for actuation by the carriage 10 as it nears the extreme end positions for controlling the speed of the corresponding processing equipment, and a rheostat or other suitable device 32 may also be mounted on the upper structural members 8 with a weight W suspended therefrom for engagement by the carriage during the last few feet of its upward movement to control the speed of the corresponding processing equipment as the carriage nears its uppermost position. Other speed regulating devices 33 such as a rheostat, saturable type reactor, seslyn, or potentiometer shown in phantom lines in FIG. 2 may also be driven by one of the sprockets 27, 28 for regulating the speed of the corresponding processing equipment at any position of the carriage to synchronize and control the speed of the strip material moving through the apparatus as required.

From the foregoing, it will now be apparent that the combination storage festoon and compensator of the present invention is of a relatively simple and inexpensive design as compared to conventional storage festoons, and the unique configuration of the movable carriage provides greater stability and better distribution of the forces acting theron to prevent tilting or cocking of the carriage during raising and lowering thereof. The carriage and guide frame are also quite compact permitting them to be shipped completely assembled, and the apparatus has relatively few parts which require handling and assembly.

The embodiments of the invention in which an exclusive property or privilege is claimed are defined as follows:

1. A combination storage festoon and compensator apparatus comprising a main frame including a support base, a plurality of stationary guide rolls mounted on said support base, a vertically movable carriage having a plurality of movable guide rolls mounted thereon, means for raising and lowering said carriage and thus said movable guide rolls carried thereby relative to said stationary guide rolls, and two pairs of spaced apart vertical guides for guiding the movements of said carriage during raising and lowering thereof, said carriage comprising a pair of spaced apart side frames each including a vertically extending center plate each guided by one pair of said vertical guides, a generally horizontal cross member attached to said center plate, the ends of said movable guide rolls being supported by said cross members with said movable guide rolls uniformly distributed on both sides of the vertical center line of said carriage to prevent undesirable canting or tilting of said carriage during vertical movement thereof, and plural vertically spaced cam rollers mounted on said center plates adjacent each vertical side thereof engageable with said vertical guides for guiding the movements of said carriage, said means for raising and lowering said carriage comprising a pair of fluid cylinders mounted adjacent said vertical guides, rods projecting from said cylinders, sprockets attached to the free ends of said rods, chains having one end fixed against movement and the other end attached to the vertical centers of said side frames, said chains extending around said sprockets on said rods and over a pair of additional sprockets fixedly mounted above each of said side frames for transmitting the force of said hydraulic cylinders to the vertical centers of the respective side frames.

2. The apparatus of claim 1 wherein at least one of said additional sprockets above each of said side frames is mounted on a common shaft to assure simultaneous raising and lowering of both of said side frames at the same rate.

3. The apparatus of claim 1 further comprising means driven by one of said additional sprockets for regulating the speed of a corresponding processing operation at various positions of said carriage.

4. The apparatus of claim 1 wherein said cam rollers have eccentric hubs, and means for adjusting the position of said hubs to vary the horizontal distance between said cam rollers to eliminate any undesirable clearance space between said cam rollers and vertical guides.

5. The apparatus of claim 1 wherein spreader plates are attached to said guides along the length thereof to maintain the proper spacing therebetween.

6. The apparatus of claim 1 further comprising means responsive to the movement of said carriage toward an extreme vertical position to regulate the speed of a corresponding processing operation.

7. A combination storage festoon and compensator apparatus comprising a main frame including a support base, a plurality of stationary guide rolls mounted on said support base, a vertically movable carriage having a plurality of movable guide rolls mounted thereon, means for raising and lowering said carriage and thus said movable guide rolls carried thereby relative to said stationary guide rolls, and two pairs of spaced apart vertical guides for guiding the movements of said carriage during raising and lowering thereof, said carriage comprising a pair of spaced apart side frames each including a vertically extending center plate each guided by one pair of said vertical guides, a generally horizontal cross member attached to said center plate, the ends of said movable guide rolls being supported by said cross members with said movable guide rolls uniformly distributed on both sides of the vertical center line of said carriage to prevent undesirable canting or tilting of said carriage during vertical movement thereof, and plural vertically spaced cam rollers mounted on said center plates adjacent each vertical side thereof engageable with said vertical guides for guiding the movements of said carriage, a rheostat mounted on said main frame above said vertically movable carriage, and a weight suspended from said rheostat for engagement by said carriage during the last few feet of upward movement of said carriage for regulating the speed of a corresponding processing operation as said carriage nears its uppermost position.

\* \* \* \* \*